United States Patent [19]

Lang

[11] E Patent Number: Re. 33,359

[45] Reissued Date of Patent: Oct. 2, 1990

[54] PLANING CATAMARAN VESSEL

[76] Inventor: Thomas G. Lang, 417 Loma Larga Dr., Solana Beach, Calif. 92075

[21] Appl. No.: 399,602

[22] Filed: Aug. 28, 1989

Related U.S. Patent Documents

Reissue of:

[64] Patent No.: 4,802,428
Issued: Feb. 7, 1989
Appl. No.: 26,774
Filed: Mar. 17, 1987

[51] Int. Cl.[5] ..... B63B 1/00

[52] U.S. Cl. ..... 114/61; 114/283

[58] Field of Search ..... 114/61, 126, 265, 271, 114/274–282, 283–285, 288–292

[56] References Cited

U.S. PATENT DOCUMENTS

| | | | |
|---|---|---|---|
| 1,024,682 | 4/1912 | Fauber | 114/291 |
| 2,547,146 | 4/1951 | Anthony | 114/291 |
| 3,547,062 | 12/1970 | Rainu | 114/292 |
| 3,623,444 | 11/1971 | Lang | 114/61 |
| 3,636,907 | 1/1972 | Scarritt, Sr. | 114/283 |
| 3,830,178 | 8/1974 | Lang | 114/61 |
| 3,842,772 | 10/1974 | Lang | 114/61 |
| 3,866,557 | 2/1975 | Lang | 114/61 |
| 3,896,755 | 7/1975 | Marbury | 114/126 |
| 3,897,744 | 8/1975 | Lang | 114/61 |
| 3,981,259 | 9/1976 | Harper, Jr. | 114/61 |
| 4,091,761 | 5/1978 | Fehn | 114/61 |
| 4,159,691 | 7/1979 | Paxton | 114/290 |
| 4,174,671 | 11/1979 | Seidl | 114/265 |
| 4,348,195 | 9/1982 | Lantz | 440/100 |
| 4,440,103 | 4/1984 | Lang | 114/61 |
| 4,552,083 | 11/1985 | Schmidt | 114/61 |
| 4,606,291 | 8/1986 | Hoppe | 114/61 |
| 4,863,586 | 2/1986 | Hargett et al. | 114/283 |

FOREIGN PATENT DOCUMENTS

| | | | |
|---|---|---|---|
| 2003154 | 3/1969 | France | 114/285 |
| 55565 | 4/1967 | German Democratic Rep. | 114/274 |
| 1260831 | 1/1972 | United Kingdom | 114/61 |

OTHER PUBLICATIONS

"The Wavestrider Family of Planing Boats"; P. Payne; AIAA Advance Marine System Conference, Sep. 1986.

"Design of the Wave Piercing Catamaran"; P. C. Hercus, Paper No. 14, RINA Int. Conference on Swath Ships on Advanced Multi-Hulled Vessels, U.K., Apr. 1985.

"Development of Hycat", D. E. Calkius, AIAA Advanced Marine Systems Conference, Paper No. 86-2381, Sep. 1986.

*Primary Examiner*—Joseph F. Peters, Jr.
*Assistant Examiner*—Jesûs D. Sotelo
*Attorney, Agent, or Firm*—Brown, Martin, Haller & McClain

[57] ABSTRACT

A catamaran vessel comprises a pair of spaced, parallel elongated pontoons with a strut extending upwardly from each of the pontoons and a superstructure supported on the struts for riding above the waterline. Each pontoon has a sharp chine at its inner and outer edges and is of varying cross-sectional width along at least part of its height, with the widest point in the cross-section being situated below the upper surface of the pontoon. The lower surface of each pontoon comprises a planing surface on which the vessel planes at speed.

36 Claims, 2 Drawing Sheets

PLANING CATAMARAN VESSEL

Matter enclosed in heavy brackets [ ] appears in the original patent but forms no part of this reissue specification; matter printed in italics indicates the additions made by reissue.

BACKGROUND OF THE INVENTION

The present invention relates generally to catamaran-like vessels in which a superstructure or platform is supported on a pair of hulls, and is particularly directed to a vessel designed to plane on the watersurface at speed.

Vessels capable of planing on the watersurface are able to reach high speeds in view of the fact that the vessel is lifted up out of the water to reduce skin friction and wavemaking drag. In some boats, leg-type retractable hydrofoils are employed at the front end of the boat to lift it up out of the water at speed. Other designs employ ski-like structures. However, these vessels have hulls which rest in the water at preplaning speeds and are therefore subject to relatively high drag at such speed. A wave making "drag hump" occurs as such vessels start to lift out of the water, with the bow rising and the stern dropping, and increased power will be required to achieve planing speeds.

In catamaran-like vessels having twin hulls supporting a platform or superstructure, it is known to utilize submerged, buoyant hulls to support the superstructure on struts above the waterline. Such a structure is described in my U.S. Pat. No. 3,866,557. This structure employs rectangular shape hulls for supporting the boat platform. This produces increased stability. The structure is designed so that the waterline at rest lies at about the mid-point of the struts, dependent on the boat load. Although not specifically designed for this purpose, the vessel described in this reference is capable of planing on the lower hulls at high speed with sufficient power. However, this structure is not particularly efficient for planing purposes, and has to lift a substantial distance out of the water to plane.

SUMMARY OF THE INVENTION

It is an object of the present invention to provide a catamaran-like vessel which is capable of planing on the water surface at speed.

According to the present invention, a catamaran vessel is provided, which comprises a pair of spaced, elongated pontoons each having at least one strut extending upwardly from it, and a superstructure supported on the struts above the waterline. Each pontoon has sharp chines extending along its inner and outer edges, and has a cross-sectional width which varies along at least part of its height, with the widest point on the cross-section being spaced below the upper surface of the pontoon. The lower surface of each pontoon comprises a planing surface which is designed to plane on the water surface at speed.

The struts have streamlined forward regions and are thinner than the attached pontoons, which may provide most of the buoyancy for lifting the platform or superstructure out of the water. The pontoon buoyancy is preferably designed such that at rest under fully loaded conditions the water line will lie at or close to the top of the pontoons, so that most of the strut will be out of the water. However, the water line may be slightly above or below this point, and at high loads part of the struts may also be sumbmerged.

Because the pontoons are close to the water surface at all times, there will be less vertical distance to lift the vessel out of the water to plane and thus less resistance to planing. Preferably, the pontoons have a width about three times the strut width. The thin surface-piercing struts will reduce drag at preplaning speeds, and as the vessel speed increases, the lower planing surfaces and edge chines will raise the pontoons out of the water to plane on the water surface. The long, relatively narrow pontoons, thin struts, and height of the superstructure above the pontoons will reduce the vertical acceleration in waves when planing, increasing boat stability.

The planing surface is preferably generally V-shaped, and may be asymmetrical. The surface preferably has an inboard and an outboard deadrise angle, and the inboard deadrise angle is preferably greater than the outboard deadrise angle. The inboard deadrise angle is preferably in the range from 10 degrees to 90 degrees, while the outboard deadrise angle preferably lies in the range from 10 degrees to 25 degrees.

The upper surface of each pontoon may be V-shaped or rounded, and may be either symmetrical or unsymmetrical about the line of attachment to the respective strut. Preferably, the pontoons each have downwardly curved lips at their outer edges, and may have similar lips at their inner edges, for improved lift and reduced drag.

The pontoons shapes are designed for reduced wetted surface area, and thus reduced drag, at low, preplaning speeds, while increasing efficiency at planing speeds due to the varying cross-sectional width.

BRIEF DESCRIPTION OF THE DRAWINGS

The present invention will be better understood from the following detailed description of some preferred embodiments of the invention, taken in conjunction with the accompanying drawings, in which like reference numerals refer to like parts, and in which.

DESCRIPTION OF THE PREFERRED EMBODIMENTS

Figure 1:
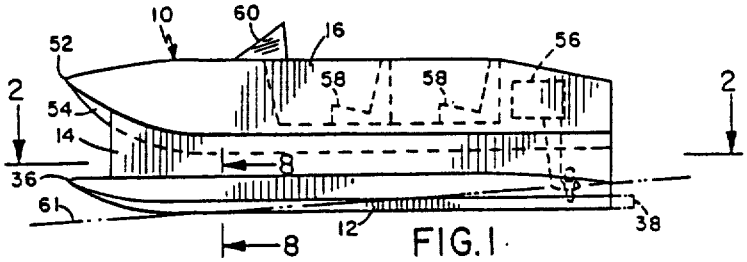
FIG. 1 is a side elevation view of a typical small boat incorporating the planing catamaran structure.

FIGS. 1 to 3 and 8 of the drawings show a catamaran-like vessel 10 according to a first embodiment of the present invention. The vessel 10 shown in the drawings is a small power driven pleasure boat. However, this invention can be applied to any size boat from several feet long to 100 feet or more having relatively high speed, such as pleasure boats, commercial boats or military boats, and can also be applied to sailboats.

Figure 5:
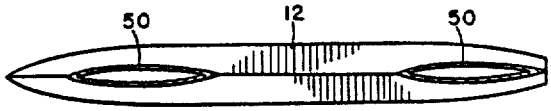
FIG. 5 is a sectional view similar to FIG. 2, showing a dual strut configuration.

The vessel 10 basically comprise a pair of spaced, parallel elongated pontoons or hulls 12 each having at least one strut 14 extending upwardly from it, and a superstructure or platform 16 supported on the struts. Although only one strut is shown extending along the length of each pontoon in the embodiment of FIGS. 1 to 3, two or more struts 50 may be used as shown in the modification of FIG. 5.

Figure 3:
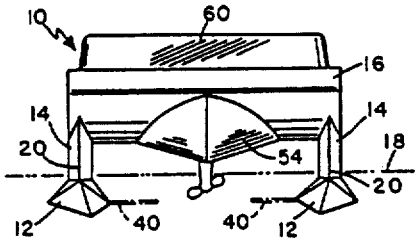
FIG. 3 is a front end view of the boat of FIG. 1.

As shown in FIG. 3, the pontoons 12 are submerged below the waterline 18 when the vessel is at rest in the water while the superstructure 16 is raised up out of the water. The pontoons are buoyant members of a suitable lightweight material such as metal, wood, plastics or fiberglass, or combinations of these materials, and they may be hollow as shown or filled with a suitable buoyant material such as foam.

Figure 2:
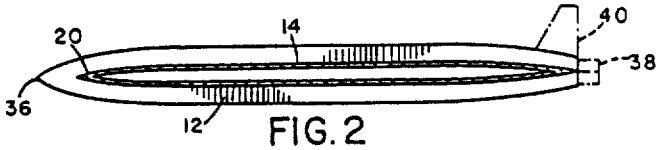
FIG. 2 is a sectional view taken on the line 2—2 of FIG. 1.

As shown in FIGS. 2 and 3, the struts 14 are thinner than the pontoons and have streamlined nose regions 20, for reduced drag when travelling through the water at low speeds. They are preferably hollow and constructed of similar materiai to the pontoons. Preferably, the pontoons have a maximum thickness about three times that of the struts. The pontoons preferably extend at least to the length of the superstructure. The pontoon buoyancy is designed such that at rest under normal or fully loaded vessel conditions, the water level 18 lies at or close to the top of the pontoons, as shown in FIG. 3. Thus the majority or all of the buoyancy for lifting the vessel out of the water is provided by the pontoons. The water level 18 may be above or below the level shown in FIG. 3, dependent on the pontoon buoyancy and the boat load. Under very light loads up to half of the pontoon volume may be out of the water. Under full or high loads, part of the struts may also be submerged. The buoyancy of the submerged parts of the pontoons and struts will be equal to the total boat weight in air.

Figure 8:
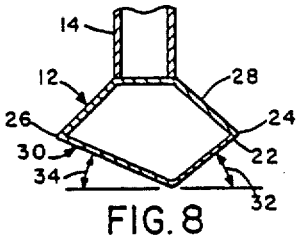
FIG. 8 is an enlarged sectional view taken on the line 8—8 of FIG. 1.

The pontoons themselves are shaped to plane on the water surface at high speed. A suitable planing shape is shown in FIG. 8. As shown in FIG. 8, each pontoon has sharp chines 22 at its inboard and outboard edges 24, 26, respectively and has a cross-sectional width which varies along its height, with the widest portion of the pontoon being spaced below the point of attachment to the strut and below the upper surface 28 of the pontoon. The lower surface 30 of the pontoon comprises a planing surface, and is preferably V-shaped and asymmetrical as shown in FIG. 8. A V-shape is generally the most efficient planing surface shape. In the embodiment shown in FIG. 8, the upper surface of the pontoon is an inverted V-shape. The upper surface may be symmetrical as shown, or unsymmetrical.

As can be seen in FIG. 8, the planing surface 30 of the pontoon has inboard and outboard deadrise angles 32, 34, respectively, which are preferably different, with the inboard deadrise angle preferably being greater than the outboard deadrise angle. The asymmetry and different deadrise angles improve the turning or banking ability of the boat and also allow it to turn faster. In the embodiment shown in FIG. 8 the outboard deadrise angle is of the order of 15 degrees while the inboard deadrise angle is of the order of 28 degrees. However, the outboard deadrise angle may be anywhere in the range 10 to 25 degrees while the inboard deadrise angle may lie between 10 degrees to 90 degrees. FIGS. 9 to 15 show some alternative pontoon configurations, which will be described in more detail below.

Referring back to FIGS. 1 to 3, it can be seen that the forward region of each pontoon is also streamlined, and curves into a point or near-horizontal line at the bow 36, which is located somewhere between the mid-plane and upper surface of the pontoon, and may even be located above the upper surface of the pontoon in a water-ski like configuration. This may improve the planing characteristics of the pontoons, and the general streamlining will reduce drag at preplaning speeds. The rear portion of the pontoon also tapers, and is preferably cut off before it tapers to a point, as shown in FIGS. 1 and 2.

FIG. 2 shows optional trim plates 38 or inboard trim foil 40 which may be placed near the transom of each pontoon to control the trim and help stabilize the boat in pitch. The trim plates may be needed for some larger boats where the trim angle needs to be controlled to get over the socalled "drag hump" as the vessel starts to plane, or may be used in any size boat simply to control the planing angle. One trim plate is attached to the rear end of each face of the V-shaped planing surface. The trim foil can be used in a similar fashion, but would also provide greater pitch stability for extended operation at speeds below the "drag hump".

The struts 14 are preferably tapered at both their front and rear ends, as shown in FIG. 2, to reduce drag in low speed travel. The taper on one side of the strut may be different from that on the other side at the rear or aft end, if this should prove more convenient in manufacture. The rear portion of each strut may be cut off before it tapers to a point, as shown in FIG. 2. In the embodiment shown in FIG. 2, the struts are generally vertical and are attached along the center line of the upper surface of the pontoon. However, they may be attached off-center to the pontoons, as described in more detail below and shown in FIGS. 4, 10 and 15.

Any suitable superstructure 16 may be provided for the vessel, depending on its intended use. In the embodiment shown in FIGS. 1 to 3, the vessel is a small, motor-driven pleasure craft. The superstructure is located at about one pontoon height above the water surface when the vessel is at rest, as shown in FIG. 3. The upper and lower surfaces of the superstructure near the bow preferably taper to a horizontal line at the bow 52, as indicated in FIG. 1, which lies between 10 percent and 100 percent of the distance between the bottom and top surface of the superstructure, and preferably between 40 and 100 percent. In the preferred embodiment the bow line 52 is located at about 65 percent of the distance above the bottom of the superstructure. The upper surface of the cross structure may taper downward near the stern, as shown in FIG. 1.

The superstructure shown in FIG. 3 has a V-shaped formation 54 under its center which tapers to a point at the bow, extends along the full length of the superstructure, and is cut off at the stern. The V-shaped formation is preferably centered at or around the centerline of the superstructure. The forward end of the formation 54 preferably merges into the underside of the superstructure at or near the bow, while the aft end terminates in the vicinity of the stern of the superstructure, and is preferably untapered and cut off. The side edges of the V-formation preferably terminate about one strut thickness inboard of each strut. The V-formation at the bow will help to reduce wave impact loads on the cross structure in heavy seas, and also provides an increased, lowered area at the stern for mounting of an outboard motor.

Figure 4:
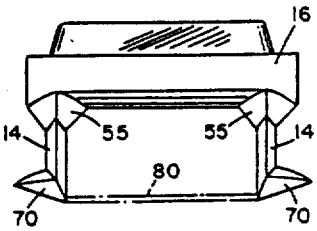
FIG. 4 is a front end view showing an alternative pontoon and strut arrangement.

More than one longitudinal V-formation 54 may be provided in alternative embodiments. In FIG. 4, a modified version is shown in which V-formations 55 on each side of the structure are used to secure the upper end of the struts to the undersurface of the superstructure. Inboard engines may be located in each of the V-formations. In addition to the reduction of wave impact loads on the cross structure, this version also provides mounting points for two outboard motors at the stern, and also reduces stresses in the struts by spreading out the strut loads over a larger area of the cross structure. The enlarged V-formation at the stern also provides an increased mounting area which may be useful in larger scale boats for mounting relatively large engines. One or more additional V-formations could be placed between the struts.

Inboard or outboard engines, or sails may be used for power. In the embodiment shown in FIGS. 1 to 3, a single outboard motor 56 driving a propeller is shown attached to the superstructure transom. More than one motor may be attached to the transom. An inboard motor may be located in the superstructure, in a longitudinal V region below the superstructure, in a pontoon, or in a region where the strut joins the pontoon which has been locally enlarged. This latter alternative is illustrated by bulge portion 57 in FIG. 14. Any suitable drive train may be used to transmit power from such an inboard motor to a thruster.

The superstructure shown in FIG. 1 is provided with suitable seats 58, a forward windshield 60, and a cargo compartment (not shown). However, alternative boat platform designs may be used, dependent on the size and intended use of the vessel.

The transom of the superstructure preferably lies in the region of, or forward of the transom of the struts, while the transom of the struts preferably lies in the region of, or forward of the transom of the pontoons.

When the vessel shown in FIGS. 1 to 3 is at rest or travelling at low speeds, the pontoons will be submerged with the water line 18 in the vicinity of the top of the pontoons, depending on the boat load. Thus, the water line 18 may in practice be slightly above or below the level shown in FIG. 3, and may even be well below the top of the pontoons under very light load conditions. The wave motion will be reduced because most of the mass of the vessel is raised up out of the water and away from impact, and also because the pontoons are designed to have relatively small water plane areas and damp out motion since their maximum beam typically lies below the water surface. When travelling at low, preplaning speeds, drag will be low due to the thin, streamlined struts and completely or mostly submerged pontoons.

As the speed is increased, the planing surfaces and chines of the struts will lift the vessel out of the water until it starts to plane. Since the pontoons are not submerged very far below the water surface prior to planing, the amount of lift required to raise the vessel completely out of the water is reduced or minimized. The planing water line 61 is shown in FIG. 1. The wave making "drag hump" as the vessel starts to plane is reduced due to the narrow width or beam of the pontoons and the pontoon shape. Once the vessel is planing on the water surface, it will be able to reach higher speeds due to reduction in the wave making drag. The planing catamaran vessel will be more stable due to the reduction in vertical acceleration when planing as a result of the long, narrow pontoons which provide the planing surfaces, the thin struts, and the height of the superstructure above the pontoons.

Figure 9:
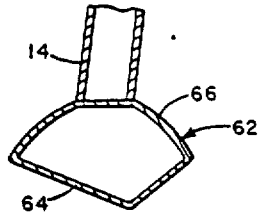
FIG. 9 is a similar sectional view showing an inclined strut and an alternative pontoon shape.

FIGS. 9 to 15 show some alternative pontoon shapes having planing surfaces which may be attached to struts 14 of a vessel as shown in FIGS. 1 to 3 or 4. In FIG. 9, pontoon 62 has a planing surface 64 identical to that shown in FIG. 8 while the upper surface 66 is rounded or oval rather than angular. Strut 14 attaches to the center of the upper surface 66. In FIG. 9, strut 14 is shown canted inwardly. Although in the preferred embodiments of the invention the struts are generally vertical, they may optionally be canted in, canted out, or curved. The cant may be determined by the desired width of the passenger platform or superstructure relative to the pontoon spacing. In FIG. 3, the superstructure width is the same as the distance between the outer surfaces of the struts, while in FIG. 4 the superstructure is wider than the strut spacing.

Figure 10:
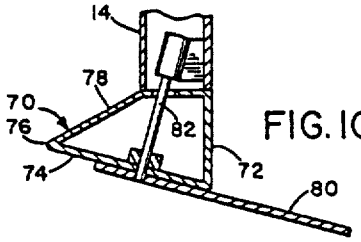
FIG. 10 is a similar sectional view showing another alternative pontoon shape and an extendible hydrofoil.
Figure 11:
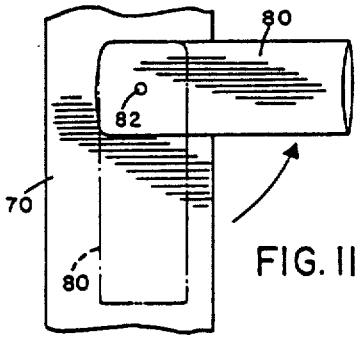
FIG. 11 is an underside view of the structure of FIG. 10.

In FIGS. 10 and 11, pontoon 70 is of an asymmetrical shape and has a flat inboard face 72, outwardly angled planing surface 74, and outboard chine 76 separates planing surface 74 from upper surface 78. The strut 14 in this embodiment is attached asymmetrically. This version of the pontoon is also shown in the vessel of FIG. 4. An optional, cantilevered hydrofoil 80 is pivotally attached via shaft 82 to each of the pontoons 70, and cants inward and downward of the pontoon. The hydrofoils can be retracted as indicatd in FIG. 11 by being rotated rearwardly to a position flush with a part of the lower surface of the pontoon. Hydrofoils such as this may be used optionally with any of the pontoon structures shown in the drawings to provide auxiliary lift. They do not lift the boat out of the water as in a normal hydrofoil boat, but simply increase the efficiency in some cases. Optional hydrofoils 80 are illustrated in dotted outline attached to the pontoons in FIGS. 3 and 4. Hydrofoils may be desired, for example, in heavier, larger boats to improve lift.

Where hydrofoils are used, they are preferably placed on each side of the boat near to the center of gravity. One or more hydrofoils may be attached to each pontoon. Where more than one hydrofoil is placed on each side, their net area should lie near to the center of gravity. In FIG. 4, the hydrofoils 80 are more or less horizontal and span the gap between the pontoons. The particular hydrofoil used will depend on the particular application, and will only normally be necessary in relatively large boats requiring some auxiliary lift.

Figure 12:
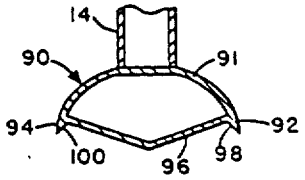
FIGS. 12 to 15 are sectional views similar to FIG. 8 showing further alternative pontoon configurations.

In FIG. 12 an alternative pontoon shape 90 is shown which has a rounded, oval upper surface 91, inboard and outboard chines 92, 94, and a symmetrical, V-shaped planing surface 96. Concave lips 98, 100 extend along the inboard and outboard edges of each pontoon. These lips will provide improved lift and therefore reduced spray when lifting out of the water, and will reduce drag. Lips may be provided on the inboard and outboard edges of any of the pontoon shapes shown in FIGS. 8 to 15. A lip may be provided at the outboard edge only, but another lip is preferably also provided at the inboard edge for improved performance, as shown in FIG. 12. The lips terminate at a downward angle between zero and 90 degrees to the horizontal. In other words, they may extend at any angle from horizontal to vertical from the edge of the pontoon. In FIG. 12, the downward angle is close to vertical but an angle of between 10 to 15 degrees to the horizontal may be optimum for small boat designs. Any size lip may be used according to the particular boat design, but in a particular embodiment of the invention comprising a small, trailer size pleasure boat lips of approximately 3% of the maximum pontoon width were used.

Figure 13:
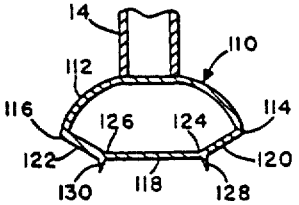

The pontoon shape 110 shown in FIG. 13 consists of an upper, rounded surface 112, inboard and outboard edges or chines 114, 116, and a planing surface comprising a central flat portion 118 and inboard and outboard inclined portions 120, 122 separated from the central portion by edges 124, 126. Lips or ridges 128, 130 may be located at edges 124 and 126, respectively, as shown.

Figure 14:
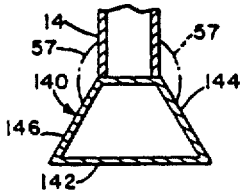
Figure 15:
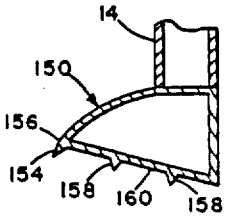

In FIG. 14 an alternative pontoon 140 is shown which is of generally trapezoid shape having a flat bottom planing surface 142, and inclined inner and outer faces 144, 146. In FIG. 15 the pontoon 150 is of a shape similar to that shown in FIG. 10 but the upper surface 152 is rounded rather than angular. An outer edge lip 154 is shown at the outboard chine 156, and additional lips 158 may be provided across the planing surface 160 as shown.

The actual pontoon shape selected will be dependent on the overall boat design and application, the relative costs of the various shapes and the structural materials used. All the shapes shown will be feasible. A preferred small boat shape will consist of a V-shaped planing surface with a rounded upper surface to minimize the wetted surface area at low, preplaning speeds. This type of shape is shown in FIG. 9. An unsymmetrical shape is preferred since this will improve turning ability. However, in some boats this may not be necessary and the symmetrical versions may prove more convenient in such designs.

Figure 6:
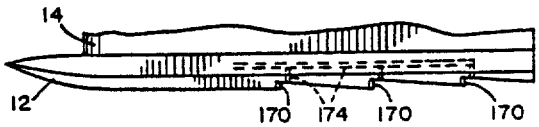
FIG. 6 is a side elevation view showing a stepped pontoon.
Figure 7:
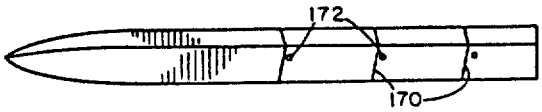
FIG. 7 is an underside view of the pontoon of FIG. 6.

FIGS. 6 and 7 of the drawings show an optional modification of the pontoon undersurface which may help to reduce drag. In the modification shown, steps 170 are provided on the planing surfaces, and openings 172 are provided to allow air to be pumped along suitable internal passageways 174 into the region behind the steps.

In one specific example of a small, trailer sized pleasure boat as shown in FIGS. 1 to 3 of the drawings above, the struts 14 were vertical, had streamlined noses, and tapered near the stern to a cut off of around 70% of their maximum width. The pontoons had a width of about 3 times the strut width, tapered at the bow to a point located about 65% of the height above the keel, and had outboard and inboard deadrise angles of about 15 degrees and 27.5 degrees, respectively. The pontoons had lips at their outer and inner edges, and had upper surfaces which were inverted vees inclined at about 45 degrees to the horizontal. The cross structure was located about one pontoon height above the water level at rest, had a width the same as the distance between the outer surfaces of the struts, and had a single V-formation below its center tapering to a point at the bow, cut off at the stern, and terminating at its sides at about one strut thickness inboard of each strut. The upper and lower surfaces of the cross structure near the bow tapered to a horizontal line at the bow located about 65% of the structure height above the bottom of the structure. The transom of the structure was located about 15% of the boat length forward of the strut and pontoon sterns. The cross structure had a retractable windshield angled up and forward about 15 degrees from the vertical. However, these specified dimensions are given by way of example only of one possible design out of many alternative vessel designs which are possible.

Although some preferred embodiments of the invention have been described above by way of example only, it will be understood by those skilled in the field that modifications may be made to the disclosed embodiments without departing from the scope of the invention, which is defined by the appended claims.

I claim:

1. A catamaran vessel, comprising:

a pair of spaced, parallel elongated pontoons;

at least one strut extending upwardly from each of the pontoons;

each strut having a streamlined nose region and having a width less than that of the attached pontoon;

a superstructure supported on said struts for riding above the waterline; and each pontoon having a lower planing surface for planing on the water surface at speed and sharp chines at its inner and outer side edges, the cross-sectional width of the pontoon varying along at least part of its height with the widest point of the cross-section being below the top of the pontoon, *at least a substantial part of* the pontoon lying [at least substantially] below the waterline when the vessel is at rest in the water, and *the pontoon* planing on the water surface with the majority of the pontoon lying above the water line when the vessel travels at speed in the water.

2. The vessel as claimed in claim 1, wherein the pontoons have sufficient displacement buoyancy for raising the superstructure and at least the majority of each strut out of the water when the vessel is at rest in the water with the water line lying in the vicinity of the top of the pontoon.

3. The vessel as claimed in claim 1, wherein the lower surface of each pontoon is generally V-shaped.

4. The vessel as claimed in claim 3, wherein the V-shaped surface is of asymmetrical cross-section about the vertical line of attachment to the strut.

5. The vessel as claimed in claim 1, wherein the upper surface of each pontoon is rounded.

6. The vessel as claimed in claim 5, wherein the rounded surface unsymmetrical about the line of attachment to the struts.

7. The vessel as claimed in claim 1, wherein the upper surface of each pontoon is of inverted V-shaped.

8. The vessel as claimed in claim 1, wherein the planing surface of each pontoon has a deadrise angle on each side of the keel.

9. The vessel as claimed in claim 8, wherein the deadrise angle on the inboard side is greater than that of the outboard side.

10. The vessel as claimed in claim 8, wherein the deadrise angle on the inboard side is between 10 degrees and 90 degrees.

11. The vessel as claimed in claim 8, wherein the deadrise angle on the outboard side is between 10 and 25 degrees.

12. The vessel as claimed in claim 1, wherein each pontoon has a downwardly curved, concave lip extending along its outer edge.

13. The vessel as claimed in claim 12, wherein each pontoon has an additional downwardly curved concave lip extending along its inner edge.

14. The vessel as claimed in claim 12, wherein the angle of the lip is between zero and 90 degrees to the horizontal.

15. The vessel as claimed in claim 12, wherein the lip terminates at a downward angle between 10 to 15 degrees to the horizontal.

16. The vessel as claimed in claim 1, wherein the forward region of each pontoon curves towards a point at its bow.

17. The vessel as claimed in claim 16, wherein the forward pointed end of each pontoon is located above the midplane of the pontoon.

18. The vessel as claimed in claim 1, wherein the rear portion of each pontoon tapers in thickness towards the rear end of the pontoon.

19. The vessel as claimed in claim 1, wherein the struts are attached off-center to the pontoons.

20. The vessel as claimed in claim 1, wherein the struts are vertical.

21. The vessel as claimed in claim 1, wherein the struts are canted.

22. The vessel as claimed in claim 1, wherein the superstructure has at least one V-shaped structure extending along its lower surface and having its pointed end in the vicinity of the bow of the superstructure.

23. The vessel as claimed in claim 22, wherein the rear end of the V-shaped structure terminates in the vicinity of the stern of the super structure.

24. The vessel as claimed in claim 22, wherein the V-shaped structure is located in the vicinity of the centerline of the cross-structure.

25. The vessel as claimed in claim 22, wherein a pair of V-shaped structures extend along the lower surface of the super structure, one on each side of the superstructure, and the struts are attached to the lower faces of the V-shaped structures.

26. The vessel as claimed in claim 25, wherein an inboard engine is located in each of the V-shaped structures.

27. The vessel as claimed in claim 1, wherein at least one cantilevered hydrofoil is attached to each pontoon.

28. The vessel as claimed in claim 27, including retracting means for retracting each hydrofoil between an extended position in which it extends inwardly and away from the pontoon into the gap between the two pontoons, and a retracted position in which it is flush with a pontoon surface.

29. The vessel as claimed in claim 1, wherein an inboard trim foil is attached to the rear end of each pontoon, the trim foil projecting inwardly and away from the pontoon axis.

30. The vessel as claimed in claim 1, wherein a rearwardly projecting trim plate is attached to the rear end of the planing surface of each pontoon.

31. The vessel as claimed in claim 30, wherein the lower surfaces is V-shaped and has two flat planing surfaces, and a rearwardly projecting trim plate is attached to the rear end of each flat planing surface of the pontoon.

32. The vessel as claimed in claim 1, wherein the planing surface of each pontoon has a plurality of steps spaced along its length.

33. The vessel as claimed in claim 32, including gas supply means for supplying gas to the region behind each step.

34. The vessel as claimed in claim 1, wherein each pontoon has a thickness of at least 2 times that of the attached strut.

35. The vessel as claimed in claim 1, wherein two struts extended upwardly from each pontoon and are attached at their upper ends to the superstructure.

36. The vessel as claimed in claim 1, wherein the region where strut joins the pontoon is enlarged, and an inboard engine is located in each of the enlarged regions.

* * * * *